(12) United States Patent
Kawabe et al.

(10) Patent No.: US 10,257,104 B2
(45) Date of Patent: *Apr. 9, 2019

(54) TERMINAL AND METHOD FOR AUDIO DATA TRANSMISSION

(71) Applicant: Sony Mobile Communications Inc., Tokyo (JP)

(72) Inventors: Yusuke Kawabe, Kanagawa (JP); Mitsuyoshi Yasuda, Tokyo (JP)

(73) Assignees: Sony Mobile Communications Inc., Tokyo (JP); Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,838

(22) Filed: Aug. 28, 2017

(65) Prior Publication Data
US 2017/0353823 A1   Dec. 7, 2017

Related U.S. Application Data

(63) Continuation of application No. 14/724,509, filed on May 28, 2015, now Pat. No. 9,756,455.

(51) Int. Cl.
*H04W 4/00* (2018.01)
*H04L 12/805* (2013.01)
(Continued)

(52) U.S. Cl.
CPC .......... *H04L 47/36* (2013.01); *H04L 27/0008* (2013.01); *H04W 4/80* (2018.02); *H04W 88/06* (2013.01)

(58) Field of Classification Search
CPC ... H04L 1/0003; H04L 1/0009; H04L 1/0023; H04L 1/0026; H04L 5/1453;
(Continued)

(56) References Cited

U.S. PATENT DOCUMENTS 5,627,821 A * 5/1997 Miyagi ................. B82Y 15/00
370/242
6,922,548 B1   7/2005 Moore
(Continued)

FOREIGN PATENT DOCUMENTS

CN     104135339    * 11/2014   ............. Y02D 50/10
EP     1619832 A2 * 1/2006     ............. A63F 13/12
(Continued)

OTHER PUBLICATIONS

Lindqvist et al., Bluetooth Specification, Advanced Audio Distribution Profile, May 22, 2003, Bluetooth SIG, Version 1.0.

*Primary Examiner* — Eric Nowlin
(74) *Attorney, Agent, or Firm* — XSensus LLP

(57) ABSTRACT

Aspects of the disclosure provide a terminal adapted to transmit audio data via Bluetooth to a device. The terminal includes a controller adapted to detect configuration parameters of the device and optimally determine configuration parameters of the terminal, and a transmission module capable of transmitting a packet of a first packet type based on a first mode of the terminal and a packet of a second packet type based on a second mode of the terminal. The audio data is modulated by a first modulation mode in the first mode and the audio data is modulated by a second modulation mode in the second mode that is more efficient than the first modulation mode. When the device cannot operate in the second mode but can operate in the first mode, the controller causes the transmission module to create a packet of the first packet type containing the audio data.

8 Claims, 7 Drawing Sheets

(51) Int. Cl.
*H04W 88/06* (2009.01)
*H04L 27/00* (2006.01)
*H04W 4/80* (2018.01)

(58) Field of Classification Search
CPC ............ H04L 27/0008; H04L 27/0012; H04L 27/2602; H04L 27/361; H04M 2250/02; H04W 4/008; H04W 8/22; H04W 28/06; H04W 76/00; H04W 80/06; H04W 88/06; H04B 1/0475
See application file for complete search history.

(56) References Cited

U.S. PATENT DOCUMENTS

| | | | |
|---|---|---|---|
| 6,963,534 B1 | 11/2005 | Shorey | |
| 7,339,911 B2 * | 3/2008 | Girola | H04L 1/0003 370/208 |
| 7,555,269 B2 * | 6/2009 | Tamaki | H04L 1/0003 375/260 |
| 7,656,960 B2 * | 2/2010 | Tamaki | H04L 1/0003 332/103 |
| 8,023,580 B2 * | 9/2011 | Bremer | H04L 1/206 332/108 |
| 8,081,588 B2 | 12/2011 | Pecen | |
| 8,254,837 B2 | 8/2012 | Tian | |
| 8,325,713 B2 | 12/2012 | Chawla | |
| 8,340,716 B2 * | 12/2012 | Sekiya | H04B 7/005 370/336 |
| 8,406,144 B2 * | 3/2013 | Sachse | G01S 5/0289 370/252 |
| 8,417,185 B2 * | 4/2013 | Braho | G10L 15/30 455/41.2 |
| 8,432,815 B2 * | 4/2013 | Bruckmann | H04L 1/0006 370/252 |
| 8,457,228 B2 * | 6/2013 | Bremer | H04L 1/206 332/108 |
| 8,565,348 B2 * | 10/2013 | Tsunoda | H04L 27/0008 329/300 |
| 8,577,291 B1 * | 11/2013 | Mak | H04L 1/203 370/465 |
| 8,615,598 B2 * | 12/2013 | Wakuda | H04L 65/80 709/231 |
| 8,879,546 B2 | 11/2014 | Chawla | |
| 8,953,611 B2 | 2/2015 | Pecen | |
| 8,989,811 B2 * | 3/2015 | Sekiya | H04B 7/005 370/336 |
| 9,065,594 B1 * | 6/2015 | Husted | H04L 1/0002 |
| 9,088,515 B2 | 7/2015 | DeCusatis | |
| 9,112,986 B2 | 8/2015 | Tucker et al. | |
| 9,237,110 B2 | 1/2016 | DeCusatis | |
| 9,276,636 B2 * | 3/2016 | Lingam | H04B 3/542 |
| 2002/0041592 A1 | 4/2002 | Van Der Zee | |
| 2002/0167932 A1 | 11/2002 | McGowan | |
| 2004/0264433 A1 | 12/2004 | Melpignano | |
| 2005/0111485 A1 * | 5/2005 | Bruckmann | H04L 1/0006 370/465 |
| 2005/0281229 A1 * | 12/2005 | Girola | H04L 1/0003 370/335 |
| 2005/0286466 A1 | 12/2005 | Tagg | |
| 2006/0018319 A1 * | 1/2006 | Palin | A63F 13/12 370/390 |
| 2006/0165189 A1 * | 7/2006 | Tamaki | H04L 1/0003 375/260 |
| 2006/0165190 A1 * | 7/2006 | Tamaki | H04L 1/0003 375/262 |
| 2006/0194538 A1 | 8/2006 | Palin | |
| 2006/0270347 A1 | 11/2006 | Ibrahim | |
| 2007/0049196 A1 | 3/2007 | Hillyard | |
| 2007/0142010 A1 | 6/2007 | Christopher | |
| 2007/0143105 A1 * | 6/2007 | Braho | G10L 15/30 704/231 |
| 2007/0288829 A1 * | 12/2007 | Aarnio | H04L 1/0007 714/760 |
| 2008/0043705 A1 | 2/2008 | Desai | |
| 2008/0125189 A1 * | 5/2008 | Tomoda | H04B 1/713 455/574 |
| 2008/0159150 A1 | 7/2008 | Ansari | |
| 2008/0300025 A1 * | 12/2008 | Song | H04M 1/6066 455/569.1 |
| 2009/0003235 A1 * | 1/2009 | Jiang | H04L 47/10 370/253 |
| 2009/0099851 A1 | 4/2009 | Pilati | |
| 2010/0165866 A1 * | 7/2010 | Sachse | G01S 5/0289 370/252 |
| 2010/0183092 A1 | 7/2010 | Lien | |
| 2010/0232618 A1 | 9/2010 | Haartsen | |
| 2010/0273417 A1 | 10/2010 | Tian | |
| 2010/0329231 A1 * | 12/2010 | Sekiya | H04W 72/1215 370/345 |
| 2011/0216669 A1 | 9/2011 | Chawla | |
| 2013/0058254 A1 | 3/2013 | Chawla | |
| 2013/0094492 A1 * | 4/2013 | Sekiya | H04W 72/1215 370/345 |
| 2013/0155887 A1 * | 6/2013 | Sachse | G01S 5/0289 370/252 |
| 2013/0194968 A1 * | 8/2013 | Masuda | H04W 48/18 370/254 |
| 2013/0304458 A1 | 11/2013 | Shavit | |
| 2014/0269277 A1 | 9/2014 | DeCusatis | |
| 2014/0270226 A1 | 9/2014 | Borgstrom | |
| 2015/0036511 A1 | 2/2015 | Cheng | |
| 2015/0055480 A1 | 2/2015 | DeCusatis | |
| 2015/0358050 A1 * | 12/2015 | Lingam | H04B 3/544 375/257 |
| 2016/0134979 A1 * | 5/2016 | El-Hoiydi | H04B 1/715 381/315 |
| 2016/0227329 A1 | 8/2016 | Pompei | |
| 2016/0358613 A1 | 12/2016 | Wang | |
| 2017/0048655 A1 * | 2/2017 | Kwon | H04L 1/00 |
| 2017/0093736 A1 | 3/2017 | Tsirkin | |
| 2017/0231000 A1 * | 8/2017 | Nagata | H04W 74/008 |

FOREIGN PATENT DOCUMENTS

| | | | | |
|---|---|---|---|---|
| EP | 1619832 A3 * | 10/2006 | | A63F 13/12 |
| JP | 2009-168739 | 8/2009 | | |
| JP | WO-2007125580 A1 * | 9/2009 | | H04L 5/0046 |
| JP | 4700106 B2 * | 6/2011 | | H04L 5/0046 |
| KR | 20050053611 A * | 6/2005 | | H04L 1/0003 |
| WO | WO-2004017554 A1 * | 2/2004 | | H04L 1/0003 |
| WO | WO-2007125580 A1 * | 11/2007 | | H04L 5/0046 |

* cited by examiner

FIG. 8

| SOUND QUALITY | EDR 2M | EDR 3M/2M (SIZE OF MTU≦1000) | EDR 3M/2M (SIZE OF MTU>1000) |
|---|---|---|---|
| HIGH | 2DH5 packet bitpool MAX75 | 2DH5 packet bitpool MAX75 | 3DH5 packet bitpool MAX64 |
| MID | 2DH5 packet bitpool MAX59 | 2DH5 packet bitpool MAX59 | 3DH5 packet bitpool MAX55 |
| LOW | 2DH5 packet bitpool MAX48 | 2DH5 packet bitpool MAX48 | 3DH5 packet bitpool MAX48 |

TERMINAL AND METHOD FOR AUDIO DATA TRANSMISSION

CROSS REFERENCE TO RELATED APPLICATION

The present continuation application claims the benefit of priority under 35 U.S.C. 120 to application Ser. No. 14/724,509 filed on May 28, 2015, the entire contents of which is hereby incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Bluetooth™ is a wireless technology that is widely used as a short range data communications platform for connecting many devices for many applications including audio streaming. Bluetooth enhanced data rate (EDR) is an enhanced Bluetooth technology that offers high speed data rate for the Bluetooth communication.

SUMMARY

Aspects of the disclosure provide a terminal adapted to transmit audio data via Bluetooth to a device. The terminal includes a controller adapted to detect configuration parameters of the device and optimally determine configuration parameters of the terminal, and a transmission module capable of transmitting a packet of a first packet type based on a first mode of the terminal and a packet of a second packet type based on a second mode of the terminal. At the transmission module, the audio data is modulated by a first modulation mode in the first mode and the audio data is modulated by a second modulation mode in the second mode that is more efficient than the first modulation mode. When the device cannot operate in the second mode but can operate in the first mode, the controller causes the transmission module to create a packet of the first packet type containing the audio data.

In an example, the terminal further includes a sub band coding (SBC) encoder adapted to encode the audio data using SBC with a bitpool value, and, when the device cannot operate in the second mode but can operate in the first mode, the controller is adapted to configure the bitpool value to be equal or smaller than a bitpool threshold.

In an embodiment, when the device can operate in both the first mode and the second mode, and has a logical link control and adaptation protocol (L2CAP) maximum transmission unit (MTU) size equal to or smaller than a MTU size threshold, the controller causes the transmission module to create a packet of the first packet type containing the audio data.

In an example, the terminal further includes a sub band coding (SBC) encoder adapted to encode the audio data using SBC with a bitpool value, and, when the device can operate in both the first mode and the second mode, and has a L2CAP MTU size equal to or smaller than a MTU size threshold, the controller is adapted to configure the bitpool value to be equal or smaller than a first bitpool threshold.

In an embodiment, the first packet type is 2DH5 packet and the second packet type is 3DH5 packet. In another embodiment, the first bitpool threshold is a maximum bit pool value in a range of bitpool value where a frequency band occupancy rate maintains a same level.

In an embodiment, when the device can operate in both the first mode and the second mode, and has a L2CAP MTU larger than a MTU size threshold, the controller causes the transmission module to create a packet of the second packet type containing the audio data.

In an example, the terminal further includes a sub band coding (SBC) encoder adapted to encode the audio data using SBC with a bitpool value, and, when the device can operate in both the first mode and the second mode, and has a L2CAP MTU larger than a MTU size threshold, the controller is adapted to configure the bitpool value to be equal or smaller than a second bitpool threshold.

In an embodiment, the controller is adapted to configure a plurality of bitpool thresholds corresponding to a plurality of sound quality levels for a SBC encoder.

Aspects of the disclosure provide a method for transmitting audio data via Bluetooth from a terminal to a device. The method includes detecting configuration parameters of the device, preparing a packet of a first packet type or a packet of a second packet type based on the detected configuration parameters of the device, and transmitting the packet of the first type containing the audio data to the device when the device cannot receive the packet of the second type but can receive the packet of the first type.

BRIEF DESCRIPTION OF THE DRAWINGS

Various embodiments of this disclosure that are proposed as examples will be described in detail with reference to the following figures, wherein like numerals reference like elements, and wherein:

FIG. 8 shows a table including exemplary configurations of a terminal according to different user options for sound quality according to an embodiment of the disclosure.

DETAILED DESCRIPTION OF EMBODIMENTS

Figure 1:
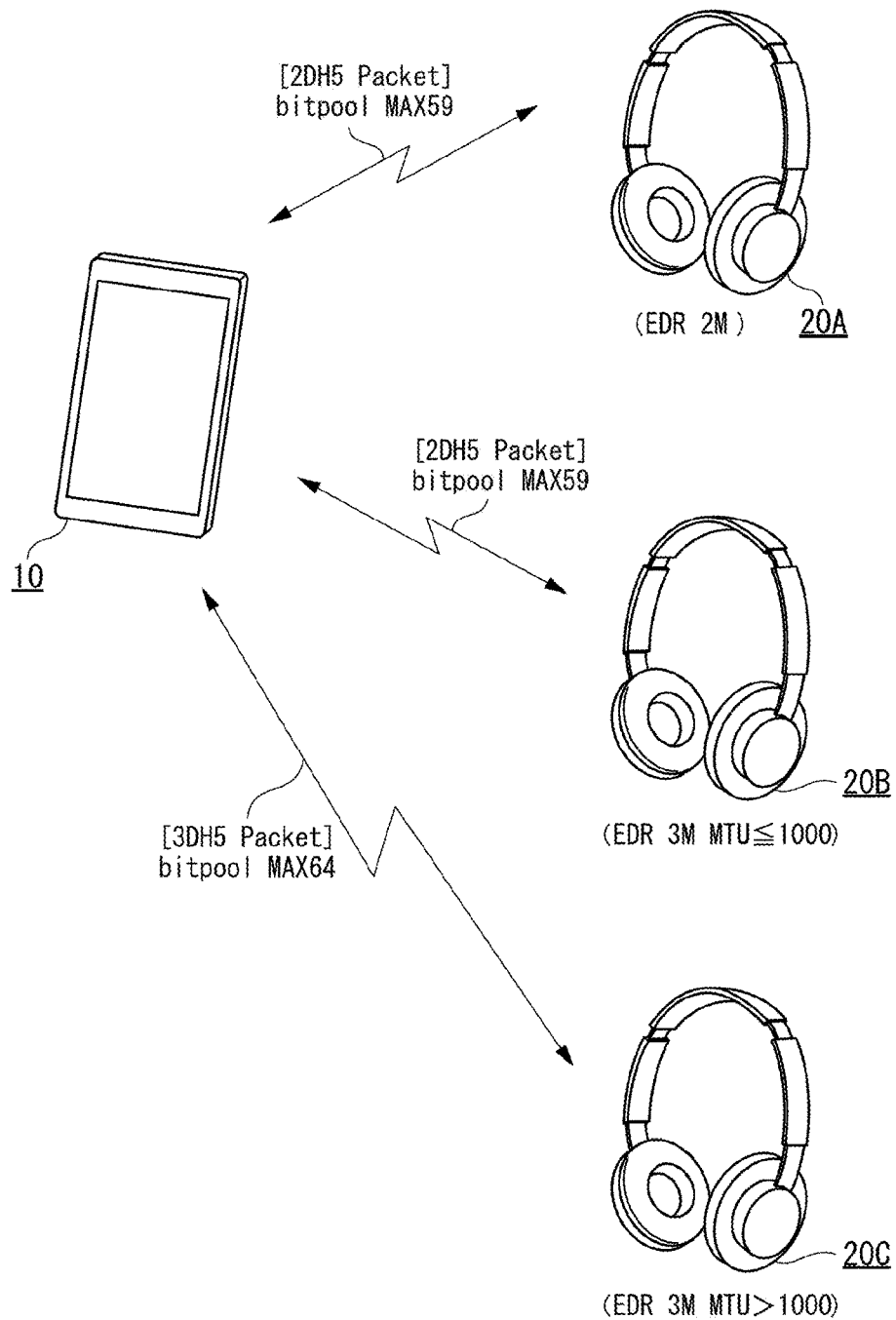
FIG. 1 shows exemplary configurations of a terminal for transmitting audio data using Bluetooth™ according to an embodiment of the disclosure.

FIG. 1 shows exemplary configurations of a terminal 10 for transmitting audio data using Bluetooth™ according to an embodiment of the disclosure. As shown, the terminal 10 communicates with a device 20A, 20B or 20C using Bluetooth to transmit audio data. Although three devices 20A, 20B and 20C are shown in FIG. 1, only one of the three devices 20A-20C can operate with the terminal 10 at a time in an embodiment. Of cause, in alternative embodiments, the terminal 10 can communicate with multiple devices simultaneously.

The terminal 10 can be a smart phone (such as an android phone, an iPhone phone, a windows phone, and the like), a computer (such as desktop, laptop, tablet, and the like), or any other device that is capable of transmitting audio data using Bluetooth. The device 20A, 20B or 20C can be a headset, a speaker, a television, a computer, or any device that is capable of receiving audio data using Bluetooth. In addition, in Bluetooth communication, a device of a transmission side, such as the terminal 10, is called a source and a device of the receiving side, such as the device 20A-20C is called a sink.

In an embodiment, the terminal 10 can transmit data using Bluetooth EDR. When transmitting data using Bluetooth EDR, the terminal 10 can operate in different EDR modes. Particularly, the terminal 10 can operate in a first mode, referred to as EDR2M mode (fixed), or a second mode, referred to as EDR3M mode. EDR2M mode (fixed) means a fixed bit rate mode using a bit rate of 2 Mbps, and EDR3M mode means a variable bit rate mode that can change between the EDR3M mode having a maximum bit rate of 3 Mbps and a mode, referred to as variable EDR2M mode, having a maximum bit rate of 2 Mbps. When operating in the first mode, the terminal can obtain a maximum data rate of 2 Mbps by using a first modulation, referred to as pi/4 differential quaternary phase shift keying (pi/4 DQPSK) modulation. When operating in the second mode, the terminal can obtain a maximum data rate of 3 Mbps by using a second modulation, referred to as eight phase differential phase shift keying (8DPSK) modulation that is more spectrally efficient than the first modulation in terms of obtaining faster data rate for fixed bandwidth. In addition, the terminal 10 uses a baseband (BB) packet to transmit audio data. Particularly, the terminal 10 uses a first-mode based BB packet for transmitting the audio data when operating in the first mode, and uses a second-mode based BB packet for transmitting the audio data when operating in the second mode. The first-mode based BB packet can have three different packet types, such as 2DH1 packet, 2DH3 packet, and 2DH5 packet, and the second-mode based BB packet can also have three different packet types, such as 3DH1 packet, 3DH3 packet, and 3DH5 packet. Each packet can have a payload field among other fields, and the respective size of the payload field of different packet types can be different. For example, in an embodiment, the payload size of a 3DH5 packet is 1021 bytes, and the payload size of a 2DH5 packet is 679 bytes.

In an embodiment, the terminal 10 can adapt its operation mode according to a corresponding operation mode configuration of the device 20A-20C. For example, during an initial communication setup process between the terminal 10 and the device 20A, the terminal 10 can detect the mode configuration of the device 20A-20C, and accordingly determine a suitable operate mode for itself. In an example, the device 20A can only operate on the EDR2M mode (fixed), and accordingly the terminal 10 can configure itself to operate in the EDR2M mode (fixed) and communicate with the device 20A in the EDR2M mode (fixed). In another example, the device 20B is capable of operating in the EDR2M mode (fixed) as well as the EDR3M mode, and the terminal 10 can choose to operate in the EDR2M mode (fixed) or the EDR3M mode based on other configuration parameters of the device 20B, or environmental conditions, such as interferences from surrounding equipment.

In an embodiment, the terminal 10 can use a sub band coding (SBC) encoder to compress audio data and subsequently generate SBC frames. The size of a SBC frame can be determined by a parameter called "bitpool value". When the bitpool value increases, the compression degree decreases and the size of the SBC frame increases, and accordingly the sound quality of the transmitted audio data increases. In addition, the SBC frames can be transmitted to a logical link control and adaptation protocol (L2CAP) packet generator that can package the SBC packets into a L2CAP packet. Generally, a maximum transmission unit (MTU) size parameter is defined for a L2CAP packet at both a source and a sink, and an application using the L2CAP packet generator for data transmission can limit the size of the data packet transmitted to the L2CAP packet generator below the MTU size limit.

Further, the L2CAP packets can be transmitted to a BB packet generator where the L2CAP packets are segmented into BB packets having certain payload sizes for transmission over the air. When segmenting a L2CAP packet into multiple BB packets, a blank space may be arranged when bits of segmentations of the L2CAP packets cannot fully fill a BB packet. The existence of blank space can reduce the efficiency of the wireless data transmission leading to a waste of wireless frequency occupation.

Generally, Bluetooth devices operate on the 2.4 GHz frequency band which is shared by many other applications, such as cordless phones, near field communication (NFC) devices, and wireless computer networks. Thus, when the terminal 10 perform Bluetooth data transmission, a low occupancy rate of the 2.4 GHz frequency band is preferable in order to reduce interference to other applications. In addition, a lower occupancy rate of the 2.4 GHz frequency band can decrease the probability of the interference received from other applications while the terminal 10 performs Bluetooth audio data transmission.

According to an aspect of the disclosure, when performing audio data transmission using the Bluetooth EDR, the terminal 10 can optimally configure the bitpool value, and the BB packet type to increase sound quality and decrease the frequency band occupancy rate.

As shown in FIG. 1, three exemplary configurations of the terminal 10 are illustrated. In the first example, the terminal 10 transmits audio data to the device 20A that is capable to operate only in EDR2M mode (fixed). The terminal 10 is configured to operate in EDR2M mode (fixed) and use packets of 2DH5 packet type for the data transmission. In addition, the bitpool value is configured to be equal to or smaller than a bitpool value 59. Note that, the suitable value of bitpool value is not limited to 59, and any other suitable value may be adopted, for example, 57 or 66. In the second example, the terminal 10 transmits audio data to the device 20B that is capable to operate in both EDR2M mode (fixed) and EDR3M mode. Because the MTU size defined for the L2CAP packets of the device 20B is set to be 1000 or smaller than 1000, the terminal 10 is configured to operate in EDR2M mode (fixed) and use packets of 2DH5 packets for the data transmission. In addition, the bitpool value is configured to be equal to or smaller than a bitpool value 59. Note that, the suitable value of bitpool value is not limited to 59, and any other suitable value may be adopted, for example, 57 or 66. In the third example, the terminal 10 transmits audio data to the device 20C that is capable to operate in both EDR2M mode (fixed) and EDR3M mode, however, the MTU size defined for the L2CAP packets of the device 20C is set to be greater than a MTU size 1000. Accordingly, the terminal 10 is configured to operate in EDR3M mode and use packets of 3DH5 packet type for the data transmission. In addition, the bitpool value is configured to be equal to or smaller than a bitpool value 64. Note that, the suitable value of bitpool value is not limited to 64, and any other suitable value may be adopted, for example, 65 or 77.

Figure 2:
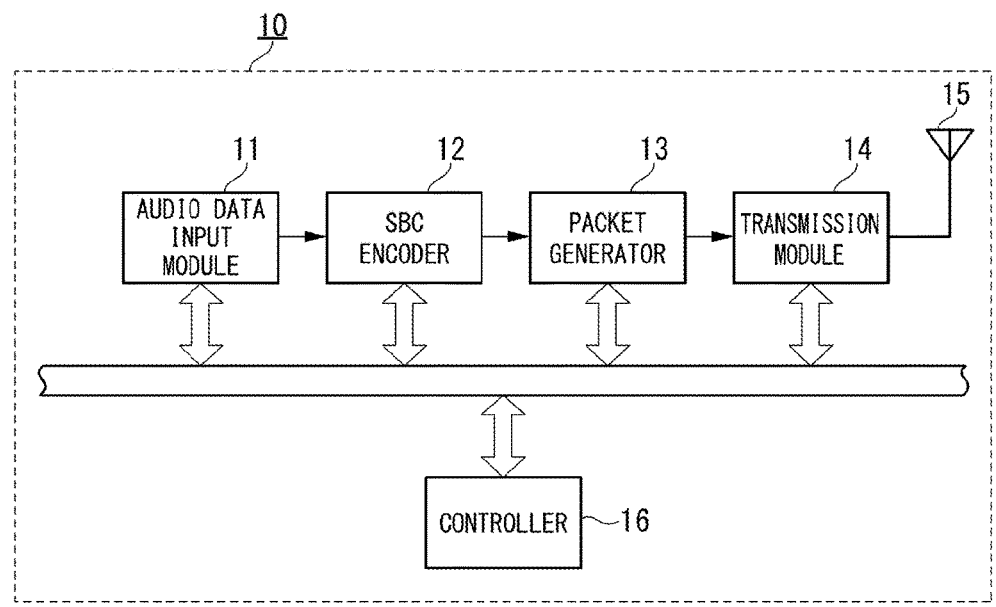
FIG. 2 shows the structure of a terminal according to an embodiment of the disclosure.

FIG. 2 shows the structure of the terminal 10 according to an embodiment of the disclosure. The terminal 10 can include an audio data input module 11, a SBC encoder 12, a packet generator 13, a transmission module 14, an antenna 15 and a controller 16. Those elements 11-16 are coupled together as shown in FIG. 2.

The audio data input module 11 can be configured to obtain audio data from outside of the terminal 10. For example, the input module 11 can use a microphone to receive an audio signal and subsequently perform encoding with an encoder, such as a pulse code modulation (PCM) encoder, to generate digitalized audio data. Alternatively, the audio data input module 11 can obtain the audio data stored in the memory (not shown) of the terminal 10. The audio data is then transmitted to the SBC encoder 12.

The SBC encoder 12 can be configured to compress the audio data to generate SBC frames based on the bitpool value configuration of the terminal 10, and transmit the SBC frames to the packet generator 13. SBC is used for encoding and decoding audio data for Bluetooth audio data transmission from a source to a sink, such as a headphone or loudspeaker, and is specified by the Bluetooth Special Interest Group (SIG).

The packet generator 13 can include a L2CAP packet generator that can be configured to receive the SBC frames from the SBC encoder 12 and package the SBC frames into a L2CAP packet. The Bluetooth logical link control and adaptation protocol is used within the Bluetooth protocol stack, and can support higher-level protocol multiplexing, packet segmentation and reassembly. The L2CAP can generate L2CAP packets with a payload configurable up to 64 kB, with 672 bytes as the default MTU size, and 48 bytes as the minimum mandatory supported MTU size.

The packet generator 13 can include a baseband (BB) packet generator that can be configured to segment the L2CAP packets into BB packets. As described earlier, BB packets can be of different types depending on the EDR2M mode (fixed) or the EDR3M mode the terminal 10 operates in. For example, when the terminal 10 operates in EDR2M mode (fixed), 2DH5 packets can be used for audio data transmission; when the terminal 10 operates in EDR3M mode, 3DH5 packets can be used. The generated BB packets are transmitted to the transmission module 14.

The transmission module 14 can be configured to receive the BB packets and transmit the BB packets over the air via the antenna 15 using suitable modulations, such as pi/4 DQPSK modulation or 8DPSK modulation.

The controller 16 includes circuitry configured to control and coordinate the audio data processing operations at the elements 11-14. For example, the controller can be configured to detect the configuration parameters of the device 20A-20C by exchanging messages with the device 20A-20C using certain protocols. In addition, the controller 16 can optimally determine the configuration parameters of the terminal 10, such as the bitpool values, the EDR modes, and BB packet types, in order to acquire higher sound quality and lower frequency band occupancy rate.

In various embodiments, the audio data input module 11, the SBC encoder 12, the packet generator 13, the transmission module 14 and the controller 16 can be implemented using any suitable software or hardware. For example, the controller 16 can be implemented as software stored in a storage module (not shown) and executed by a central processing unit (CPU) not shown. In another example, the transmission module 14 can be implemented using application specific integrated circuit (ASIC).

Figure 3:
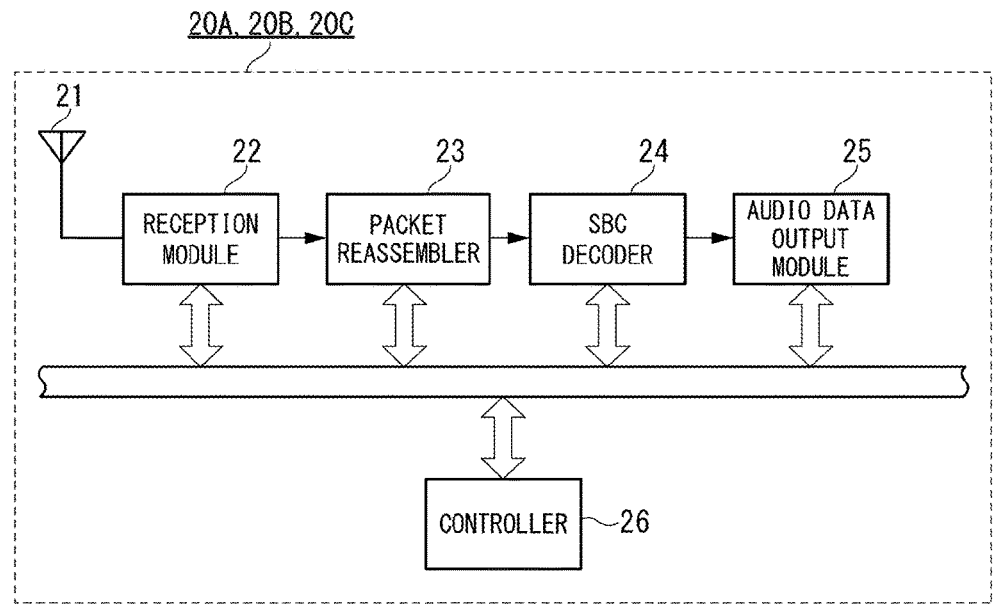
FIG. 3 shows the structure of a device according to an embodiment of the disclosure.

FIG. 3 shows the structure of the device 20A-20C according to an embodiment of the disclosure. The devices 20A, 20B and 20C have the same structure but different audio data processing capabilities and parameter configurations. As shown, the device 20A-20C can includes an antenna 21, a reception module 22, a packet reassembler 23, a SBC decoder 24, an audio data output module 25, and a controller 26.

The reception module 22 can be configured to receive radio signals via the antenna 21, generate the BB packets and transmit the BB packets to the packet reassembler 23. In some examples, the reception module 22 can operate in EDR2M mode (fixed) or EDR3M mode. In other examples, the reception module 22 can only operate in EDR2M mode (fixed). The packet reassembler 23 can include a L2CAP packet reassembler that can be configured to collect data in multiple BB packets and reassemble the data into a L2CAP packet. In addition, the packet reassembler 23 can include a SBC frame generator that can be configured to generate SBC frames from a L2CAP packet. The generated SBC frames are transmitted to the SBC decoder 24.

The SBC decoder 24 can be configured to decode the compressed audio data contained in the SBC frames to produce audio data in an uncompressed format. The produced audio data are transmitted to the audio data output module 25. The Audio data output module 25 can be configured to output an audio signal from a speaker, such as a speaker in a headset.

The controller 26 can be configured to control and coordinate the operations at the elements 22-25.

Figure 4:
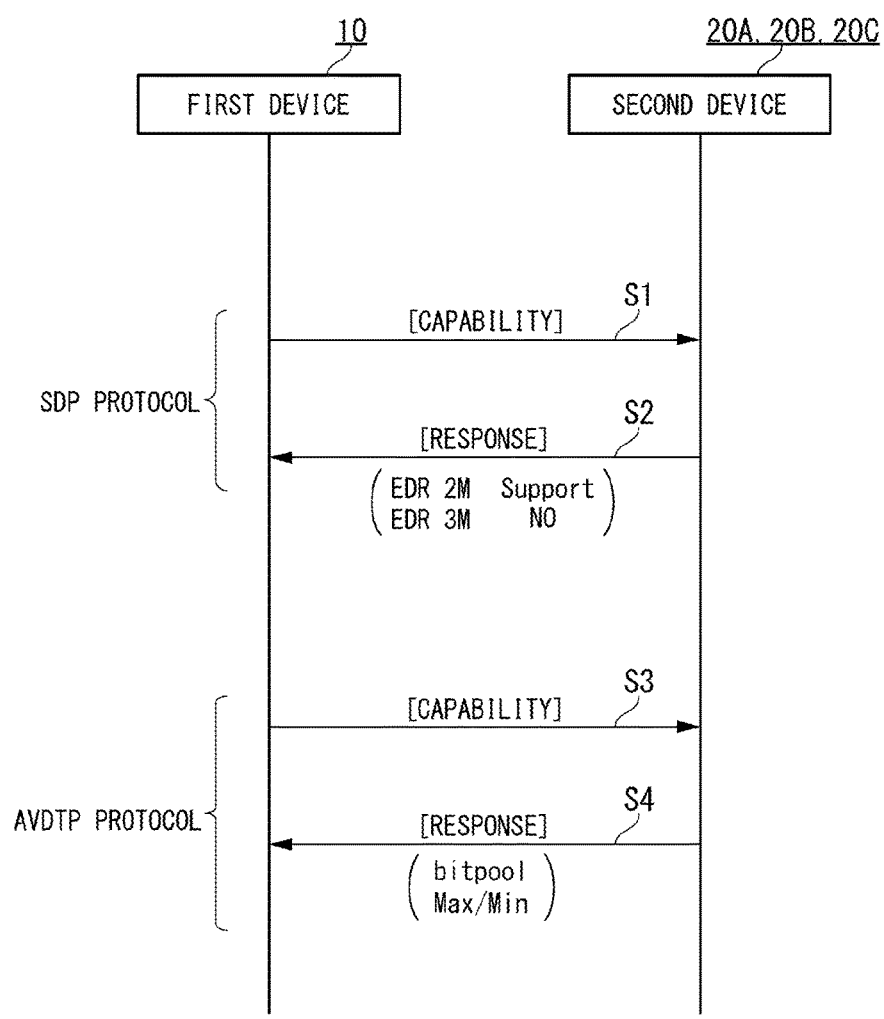
FIG. 4 shows an exemplary protocol message exchange process between a terminal and a device according to an embodiment of the disclosure.

FIG. 4 shows an exemplary protocol message exchange process between the terminal 10 and the device 20A-20C according to an embodiment of the disclosure. Generally, during the Bluetooth communication, a source can detect the configuration parameters of the sink through suitable protocols. The configuration parameters can include EDR mode capabilities, range of supported bitpool values, L2CAP MTU size, and the like. The suitable protocols can include service discovery protocol (SDP), audio/video distribution transport protocol (AVDTP), and the like.

In FIG. 4, a first phase of the protocol message exchange process can use the SDP protocol and include steps S1 and S2.

At S1, the terminal 10 can transmit a [CAPABILITY] message to the device 20A-20C to inquire the EDR mode capability information.

At S2, the device 20A-20C can transmit a [RESPONSE] message as a response to the reception of the [CAPABILITY] message to notify the terminal 10 of the EDR mode compatibility of the device 20A-20C. For example, as shown in FIG. 4, a message of [EDR2M (fixed) support, EDR3M no] is notified to the terminal 10 indicating that the device 20A can only support EDR2M mode (fixed). In the case of the device 20B or 20C, a message of [EDR2M (fixed) support, EDR3M support] is notified to the terminal 10 indicating that the device 20B or 20C can support both EDR2M mode (fixed) and EDR3M mode.

Further in FIG. 4, a second phase of the protocol message exchange process can use the AVDTP protocol and include steps S3 and S4.

At S3, the terminal 10 can transmit a [CAPABILITY] message to the device 20A-20C to enquire the range of supported bitpool values.

At S4, the device 20A-20C can transmit a [RESPONSE] message as a response to the reception of the [CAPABILITY] message to notify the terminal 10 of a range of the supported bitpool value. For example, as shown in FIG. 4, a message of [bitpool Max/Min] is notified to the terminal 10 indicating that the device 20A-20C can support a bitpool value from a minimum value to a maximum value.

Similarly, the terminal 10 can obtain a MTU size configuration parameter of the device 20A-20B using a suitable protocol, such as the L2CAP protocol.

Figure 5:
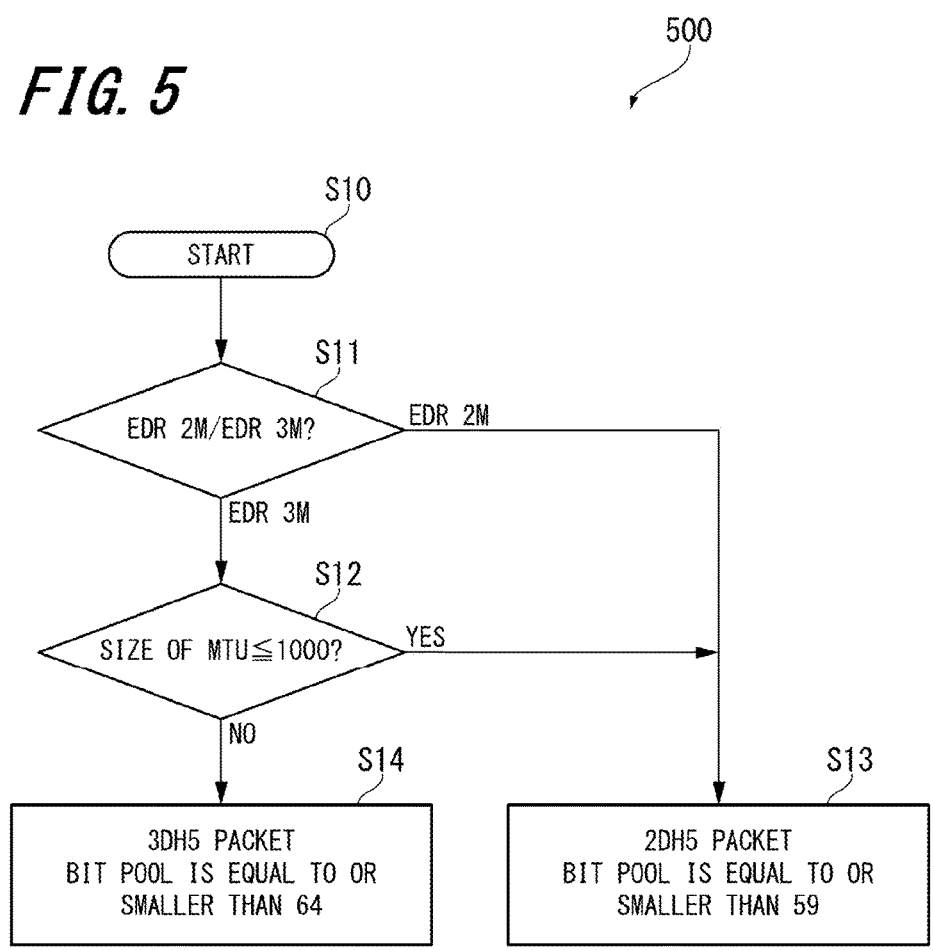
FIG. 5 shows a flowchart of an exemplary configuration process of a source for transmitting audio data to a sink via Bluetooth EDR according to an embodiment of the disclosure.

FIG. 5 shows a flowchart of an exemplary configuration process 500 of a source for transmitting audio data to a sink via Bluetooth EDR according to an embodiment of the disclosure. During the Bluetooth EDR communication, the source can optimally configure the bitpool value and the BB packet type to increase sound quality and decrease the frequency band occupancy rate. The terminal 10 and the device 20A-20C are used to describe the process 500. In addition, the configuration parameters used in the configuration process 500, such as EDR mode capabilities, range of supported bitpool values, L2CAP MTU size, and the like, can be obtained during the protocol message exchange process described in the FIG. 4 example.

The process 500 starts at S10 and proceeds to S11.

At S11, the controller 16 in the terminal 10 determines the EDR mode supported by the device 20A-20C. If the device, such as the device 20A, can only operate in EDR2M mode (fixed), the process 500 proceeds to S13. If the device, such as the device 20B or 20C can support both EDR2M mode fixed) and EDR3M mode, the process proceeds to S12.

At S12, the controller 16 determines the L2CAP MTU size supported by the device 20A-20C. If the MTU size supported by the device 20A-20C is larger than a MTU size threshold value, such as 1000, the process 500 proceeds to S13. Otherwise, the process 500 proceeds to S14. Note that, the MTU size threshold value is not limited to 1000, and any other suitable value may be adopted, for example, 950 or 1050.

At S13, under the control of the controller 16, the SBC encoder 12 in the terminal 10 can choose a bitpool value that is equal or smaller than a first bitpool threshold value, such as 59, for the SBC encoding operation. For example, if the device 20A-20C does not support the bit pool value 59 but supports the bit pool value between 49 to 57 according to the [CAPABILITY] message sent at S4 of FIG. 4, the terminal 10 can choose a bitpool value 57 which is maximum value between 49 to 57 and most close to the bit pool value 59. In addition, the transmission module 14 can be configured to operate in EDR2M mode (fixed) and use the 2DH5 packet for the audio data transmission.

At S14, under the control of the controller 16, the SBC encoder 12 can choose a bitpool value that is equal or smaller than a second bitpool threshold value, such as 64, for the SBC encoding operation. For example, if the device 20A-20C does not support the bit pool value 64 but supports the bit pool value between 57 to 62 according to the [CAPABILITY] message sent at S4 of FIG. 4, the terminal 10 can choose a bitpool value 62 which is maximum value between 57 to 62 and most close to the bit pool value 64. In addition, the transmission module 14 can be configured to operate in the EDR3M mode and use the 3DH5 packet for the audio data transmission.

FIGS. 6A-6D show some exemplary BB packets according to an embodiment of the disclosure.

Figure 6A:
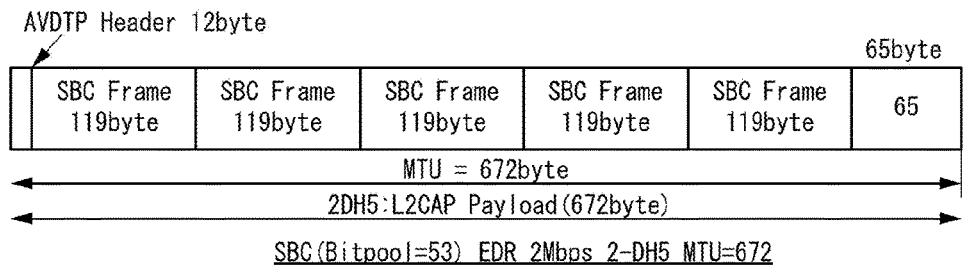
FIGS. 6A-6D show some exemplary baseband packets according to an embodiment of the disclosure.

FIG. 6A shows a 2DH5 packet transmitted in EDR2M mode (fixed). The 2DH5 packet includes an AVDTP header and five SBC frames as its payload. The SBC frames are carried by a L2CAP packet and an MTU size defined for the L2CAP packet equals to 672 bytes. Each SBC frame has a length of 119 bytes corresponding to a bitpool value of 53. As shown, a blank space of 65 bytes occurs at the end of the 2DH5 packet.

Figure 6B:
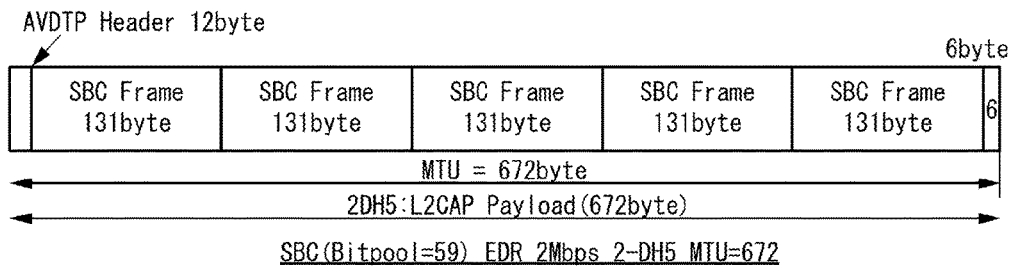

Similarly, FIG. 6B shows a 2DH5 packet that includes an AVDTP header and five SBC frames as its payload, and the SBC frames are carried by a L2CAP packet and an MTU size defined for the L2CAP packet equals to 672 bytes. However, each SBC frame has a length of 131 bytes corresponding to a bitpool value of 59. Consequently, a blank space of 6 bytes occurs at the end of the 2DH5 packet. Thus, in FIG. 6B, the configuration of bitpool value changes from a smaller value, 53, to a larger value, 59, leading to higher sound quality than in the FIG. 6A example, however, the amount of the 2DH5 packets needed for the transmission do not change, maintaining the same frequency band occupancy rate as in FIG. 6A.

Further in the FIG. 6B example, if the bitpool value continues to increase to a value above 59, the size of the SBC frame will increase accordingly. As a result, the amount of SBC frames contained in the 2DH5 will decrease, for example, to 4 or less frames due to the size limit of the 2DH5 packet. Thus, a blank space will occur at the end of the 2DH5, exhibiting a situation similar to the FIG. 6A example where the bitpool value can be continually increased from the current value while maintaining the same frequency band occupancy rate. In addition, as one more 2DH5 packet is needed to transmit the same amount of uncompressed audio data previously transmitted using only one 2DH5 packet, the amount of the 2DH5 packets needed for the transmission increases, leading to an increased frequency occupancy rate from that corresponding to the bitpool value 59.

Based on the above description, a certain bitpool value, such as the bitpool value 59, can be used as a bitpool threshold. When the bitpool value is configured to be equal or less than the bitpool threshold, the frequency band occupancy rates corresponding to the different bitpool values can be maintained at the same level. On the other side, when the bitpool value is configured to be greater than the bitpool threshold, the frequency band occupancy rate can increase to another level.

Figure 6C:
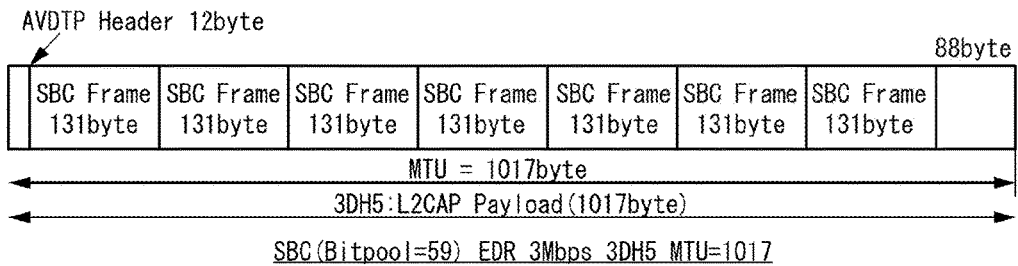

FIG. 6C shows a 3DH5 packet transmitted in EDR3M mode. The 3DH5 packet includes a plurality of SBC frames and an AVDTP header as its payload. The SBC frames are carried by a L2CAP packet and an MTU size defined for the L2CAP equals to 1017 bytes. Each SBC frame has a length of 131 bytes corresponding to a bitpool value of 59. As shown, a blank space of 88 bytes occurs at the end of the 3DH5 packet.

Figure 6D:
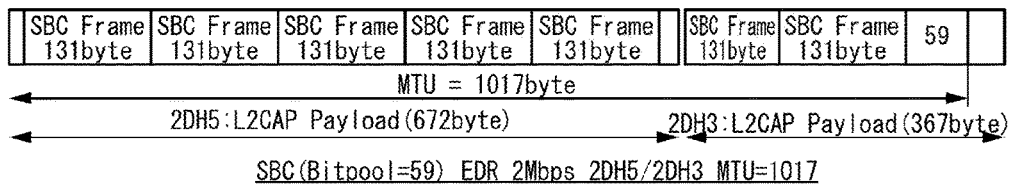

FIG. 6D shows a 2DH5 packet and a 2DH3 packet transmitted in variable EDR2M mode. The 2DH5 packet and 2DH3 packet each includes a plurality of SBC frames and an AVDTP header as its payload. The SBC frames are carried by a L2CAP packet and an MTU size defined for the L2CAP packet equals to 1017 bytes. Each SBC frame has a length of 131 bytes corresponding to a bitpool value of 59.

In FIG. 6D, compared with the FIG. 6C example, the same amount of frames (7 frames) contained in one 3DH5 packet in FIG. 6C are packaged into one 2DH5 packet and one 2DH3 packet due to the limit capacity of the 2DH5 packet and the 2DH3 packet. Particularly, the 2DH5 packet has a capacity of 672 bytes and contains five SBC frames at its payload, while the 2DH3 packet has a capacity of 367 bytes and contains two SBC frames at its payload, plus a blank space. As specified in the Bluetooth standard, the 3DH5 packet, 2DH5 packet and 2DH3 packet occupy 5, 5, and 3 time slots, respectively, when transmitted over the air. Thus, for the transmission of the same amount of audio data carried in the SBC frames, using 3DH5 packets can consume less time slots. Therefore, 3DH5 packets transmitted in EDR3M mode is preferable to other packet types transmitted in variable EDR2M mode in order to decrease the frequency band occupancy rate.

Figure 7A:
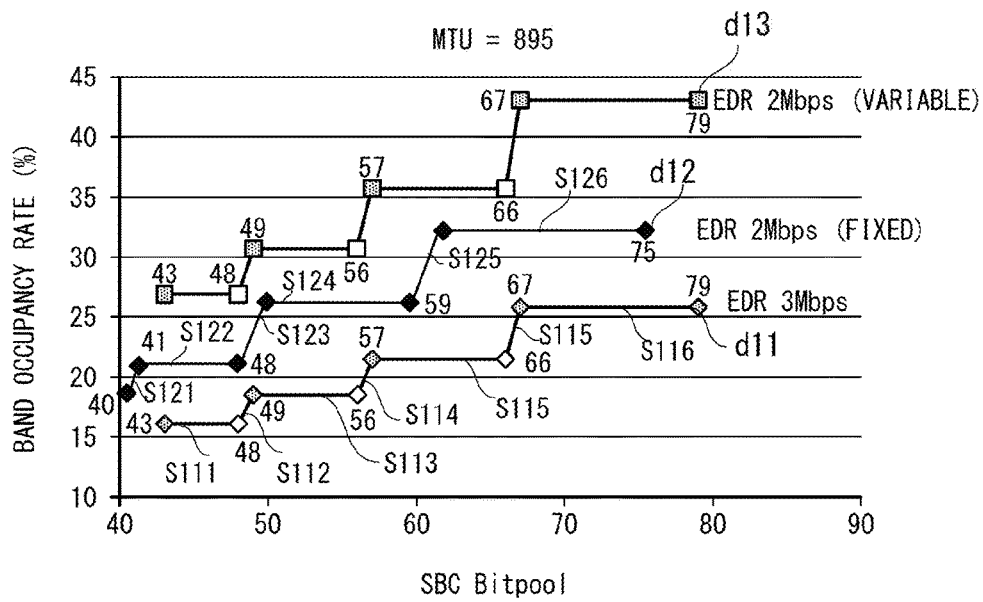
FIGS. 7A and 7B show relationship between the frequency band occupancy rate and the sub band coding (SBC) bitpool value according to an embodiment of the disclosure.
Figure 7B:
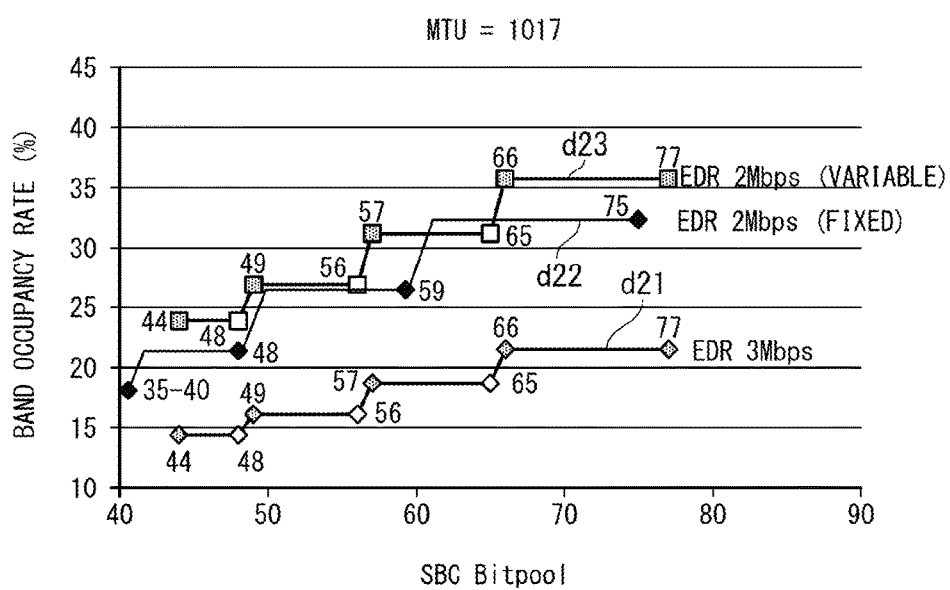

FIGS. 7A and 7B show relationship between the frequency band occupancy rate and the SBC bitpool value according to an embodiment of the disclosure. As shown, vertical axes represent the frequency band occupancy rate and horizontal axes represent the SBC bitpool value parameter.

FIG. 7A shows three broken lines d11, d12, and d13 corresponding to a first L2CAP MTU size, for example, equal to 895, while FIG. 7B shows three broken lines d21, d22 and d23 corresponding to a second L2CAP MTU size, for example, equal to 1017. The broken lines d11 and d21 can represent a situation where the terminal 10 operates in the EDR3M mode using the 3DH5 packet for audio data transmission. The broken lines d12 and d22 can represent a situation where the terminal 10 is fixed by configuration at an initial communication setup stage to operate in the EDR2M mode (fixed) using the 2DH5 packet for audio data transmission. On contrast, the broken lines d13 and d23 can represent a situation where the terminal 10 previously operated in the EDR3M mode using the 3DH5 packet but currently operates in the variable EDR2M mode using packet types, such as 2DH5 and 2DH3, for audio data transmission. The change of the modes can be caused by interferences from surrounding equipment or "preferred_rate" command issued by a user of the terminal 10.

As shown in FIGS. 7A and 7B, each of the broken lines can include multiple segments corresponding to different rages of SBC bitpool value. For example, in FIG. 7A, the broken line d11 can include multiple segments S111-S117. The segment S111 corresponds to a range of SBC bitpool value from 43 to 48, the segment S112 corresponds to a range of SBC bitpool value from 48 to 49, and so on. For another example, the broken line d12 can include multiple segments S121-S126. The segment S121 corresponds to a range of SBC bitpool value from 40 to 41, and the segment S122 corresponds to a range of SBC bitpool value from 41 to 48, and so on.

In addition, at certain segments, such as S115 and S124, the frequency band occupancy rates maintain at the same level. For example, on the broken line d11, the SBC bitpool values 48, 56, and 66 are the bitpool thresholds as described in the FIGS. 6A and 6B examples. Consequently, in the ranges of the SBC bitpool value where the SBC bitpool values are smaller than or equal to the thresholds, the frequency band occupancy rates maintain at the same level. For example, in the range of SBC bitpool value from 57 to 66 corresponding to the segment S115, the frequency band occupancy maintains a level of about 22% that does not change when the SBC bitpool values change from 57 to 66. Therefore, at these certain segments, sound quality can be increased without increasing the frequency band occupancy rate by configuring a larger SBC bitpool value.

Furthermore, for different L2CAP MTU size configurations of a source, such as the MTU sizes of 895 and 1017 in FIGS. 7A and 7B, respectively, the level of frequency band occupancy rate of the variable EDR2M mode are different. Particularly, the frequency band occupancy rate represented by the broken line d13 corresponding to the MTU size 895 is higher than that represented by the broken line d23 corresponding to the MTU size 1017. However, the level of the frequency band occupancy rate of the EDR2M mode (fixed), represented by the broken lines d12 and d22, does not change according the different MTU size. Consequently, for a smaller MTU size value, such as the MTU size of 895, the frequency band occupancy rate of the variable EDR2M mode is worse than that of the EDR2M mode (fixed), while for a larger MTU size value, such as the MTU size of 1017, the frequency band occupancy rate of the variable EDR2M mode is similar to that of the EDR2M mode (fixed).

Based on the above description, a source, such as the terminal 10, can be configured to operate in the EDR2M mode (fixed) to avoid the worse frequency band occupancy rate when the MTU size is below a MTU size threshold, such as a MTU size of 1000, even the device 20B-20C is capable to operate in EDR3M mode. For example, in an embodiment, in an initial communication setup process, the terminal 10 may detect that the device 20B-20C is capable to operate in EDR3M mode and the device 20B has a MTU size smaller than the threshold, such as a MTU size of 895 in the FIG. 7A example, and subsequently choose to operate in EDR3M mode corresponding to the broken line d11. However, the device 20B-20C can later detect that a packet loss rate is above a predetermined threshold due to interference from other communication equipment, and send a command to the terminal 10 to decrease the data rate. As a response, the terminal 10 may change the operate mode from EDR3M mode to the variable EDR2M mode corresponding to the broken line d13. Thus, the terminal 10 can be operating in a situation with the worse frequency band occupancy rate corresponding to the broken line d13 in FIG. 7A. To avoid the situation, the terminal 10 can choose to operate in the EDR2M mode (fixed) during the initial communication setup stage after detecting the MTU size that is smaller than the MTU size threshold. This fixed operate mode corresponds to the broken line d12 in FIG. 7A.

On the other side, when the MTU size is above the MTU size threshold, such as the MTU size of 1000, the source, such as the terminal 10, can be configured to operate in the EDR3M mode using 3DH5 packets for the audio data transmission to take advantage of the high data rate of the EDR3M mode. For example, the terminal 10 can detect that the device 20C is capable to operate in EDR3M mode and have a MTU size larger than the MTU size threshold, the terminal 10 can choose to operate in EDR3M mode with 3DH5 packet size corresponding the broken line d21 in FIG. 7B. In case that the interference from other equipment causes the terminal 10 to change mode to the variable EDR2M mode, corresponding to the broken line d23, the level of the frequency occupancy rate will essentially be the same level of the EDR2M mode (fixed) corresponding to the broken line d22.

FIG. 8 shows a table including exemplary configurations of the terminal 10 according to different user options for sound quality according to an embodiment of the disclosure. As shown, in an embodiment, when performing audio data transmission using Bluetooth EDR technology, a user of the terminal 10 can choose from three levels of sound quality: high quality, medium quality and low quality. Corresponding to different configurations of a sink device, such as the device 20A-20C, for each sound quality level, the terminal 10 as the source device can be configured with different configurations shown in FIG. 8.

In a first example, as shown in the second column of the table, a sink device, such as the device 20A, is only capable to operate in EDR2M mode (fixed). Accordingly, the terminal 10 can be configured to operate in EDR2M mode (fixed) and use 2DH5 packets for the audio data transmission. This configuration corresponds to the broken lines d12 or d22 in FIGS. 7A and 7B. In addition, for the three sound quality levels, the terminal 10 can choose three different bitpool thresholds, respectively. Particularly, a bitpool threshold of 75 can be configured for the high sound quality level, a bitpool threshold of 59 for the medium sound quality level and a bitpool threshold of 48 for the low sound quality level.

In a second example, as shown in the third column of the table, a sink device, such as the device 20B, is capable to operate in both EDR3M and EDR2M mode (fixed), and is configured with a MTU size equal to or smaller than a MTU size threshold, such as a MTU size of 1000. Accordingly, the terminal 10 can choose the same configurations of EDR mode, BB packet type, and bitpool threshold, as in the second column, for each option of the sound quality levels. Thus, the terminal 10 operates in the EDR2M mode (fixed).

In a third example, as shown in the fourth column of the table, a sink device, such as the device 20C, is capable to operate in both EDR3M and EDR2M mode (fixed), however, is configured with a MTU size greater than a MTU size threshold, such as a MTU size of 1000. Accordingly, the terminal 10 can be configured to operate in EDR3M mode and use 3DH5 packets for the audio data transmission. In case the surrounding interference causes the packet loss rate to be above a threshold, the terminal 10 can change from EDR3M mode to variable EDR2M mode with variable packet types. This configuration corresponds to the broken lines d21 and d23 in FIG. 7B. In addition, for the three sound quality levels, the terminal 10 can choose three different bitpool thresholds, respectively. Particularly, a bitpool threshold of 64 can be configured for the high sound quality level, a bitpool threshold of 55 for the medium sound quality level and a bitpool threshold of 48 for the low sound quality level.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A terminal adapted to transmit data to a device via a data communications platform, comprising:
   circuitry configured to
   detect configuration parameters of the device; and
   prepare one of a first packet of a first packet type based on a first mode of the terminal and a second packet of a second packet type based on a second mode of the terminal,
   wherein, when the device does not have a second capability to operate in the second mode but has a first capability to operate in the first mode, the circuitry is configured to transmit the first packet of the first packet type containing the data to the device,
   when the device has the first capability and the second capability to operate in both the first mode and the second mode, and has a protocol size equal to or smaller than a threshold, the circuitry is configured to transmit to the device the first packet of the first packet type containing the data,
   when the device has the first capability and the second capability to operate in both the first mode and the second mode, and has the protocol size larger than the threshold, the circuitry is configured to transmit to the device the second packet of the second packet type containing the data.

2. The terminal of claim 1, wherein the data communications platform is a short-range data communications platform.

3. The terminal of claim 2, wherein the short-range data communications platform is a data communications platform for connecting a plurality of devices for a plurality of applications.

4. The terminal of claim 1, wherein the data is modulated by a first modulation scheme in the first mode and the data is modulated by a second modulation scheme in the second mode.

5. The terminal of claim 4, wherein the second modulation scheme is more spectrally efficient than the first modulation scheme.

6. The terminal of claim 1, wherein the terminal is configured to communication with a plurality of devices via the data communications platform simultaneously.

7. The terminal of claim 1, wherein the terminal is configured to communication with a plurality of devices via the data communications platform, one at a time.

8. A method for transmitting data from a terminal to a device via a data communications platform, comprising:
   detecting, using circuitry of the terminal, configuration parameters of the device;
   preparing, using the circuitry of the terminal, one of a first packet of a first packet type based on a first mode of the terminal and a second packet of a second packet type based on a second mode of the terminal;
   when the device does not have a second capability to operate in the second mode but has a first capability to operate in the first mode, transmitting, using the circuitry of the terminal, the first packet of the first packet type containing the data to the device;
   when the device has the first capability and the second capability to operate in both the first mode and the second mode, and has a protocol size equal to or smaller than a threshold, transmitting, using the circuitry of the terminal, to the device the first packet of the first packet type containing the data;
   when the device has the first capability and the second capability to operate in both the first mode and the second mode, and has the protocol size larger than the threshold, transmitting, using the circuitry of the terminal, to the device the second packet of the second packet type containing the data.

* * * * *